US012518704B2

(12) United States Patent
Kim et al.

(10) Patent No.: US 12,518,704 B2
(45) Date of Patent: Jan. 6, 2026

(54) DISPLAY DEVICE AND METHOD TO SENSE ELECTRICAL CHARACTERISTICS OF PIXELS

(71) Applicant: SAMSUNG DISPLAY CO., LTD., Yongin-si (KR)

(72) Inventors: Jung Taek Kim, Yongin-si (KR); Joon Suk Baik, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/734,496

(22) Filed: Jun. 5, 2024

(65) Prior Publication Data

US 2025/0037663 A1 Jan. 30, 2025

(30) Foreign Application Priority Data

Jul. 27, 2023 (KR) ........................ 10-2023-0098486

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2300/0819* (2013.01); *G09G 2300/0852* (2013.01); *G09G 2310/08* (2013.01); *G09G 2320/0233* (2013.01); *G09G 2320/0295* (2013.01); *G09G 2320/045* (2013.01); *G09G 2360/145* (2013.01)

(58) Field of Classification Search
CPC ............... G09G 3/3258; G09G 3/3291; G09G 2300/0819; G09G 2300/0852; G09G 2310/08; G09G 2320/0233; G09G 2320/0295; G09G 2320/045; G09G 2360/145
USPC .......................................................... 345/207
See application file for complete search history.

(56) References Cited

U.S. PATENT DOCUMENTS

| | | | | |
|---|---|---|---|---|
| 11,074,865 | B2 | 7/2021 | Lee et al. | |
| 11,877,482 | B2 * | 1/2024 | Yuan | H10K 59/131 |
| 12,062,325 | B2 * | 8/2024 | Tang | G09G 3/32 |
| 2015/0049075 | A1 * | 2/2015 | Lim | G09G 5/397 345/212 |
| 2016/0240132 | A1 * | 8/2016 | Takahiro | G09G 3/325 |

(Continued)

FOREIGN PATENT DOCUMENTS

| | | |
|---|---|---|
| KR | 10-2020-0066940 | 6/2020 |
| KR | 10-2020-0080783 | 7/2020 |

(Continued)

*Primary Examiner* — Tom V Sheng
(74) *Attorney, Agent, or Firm* — F. CHAU & ASSOCIATES, LLC

(57) ABSTRACT

A display device includes: a display panel including a plurality of pixels and a display driver configured to receive input image data, and display an image The plurality of rows are divided into row groups, and each of the row groups includes at least one row among the plurality of rows. The display driver is configured to, in a blank period different from the display period, while selecting each of the plurality of rows, acquire sensing data associated with pixels of the selected row through the sensing lines, and apply an initialization data signal to the plurality of pixels of the plurality of rows through the data lines before the at least one row of each of the row groups is selected.

18 Claims, 11 Drawing Sheets

(56) References Cited

U.S. PATENT DOCUMENTS

| | | | | |
|---|---|---|---|---|
| 2017/0162122 | A1* | 6/2017 | In | G09G 3/3291 |
| 2017/0193918 | A1* | 7/2017 | Bae | G09G 3/3291 |
| 2018/0061293 | A1* | 3/2018 | Park | G09G 3/3233 |
| 2020/0020278 | A1* | 1/2020 | Lee | G09G 3/3275 |
| 2020/0335045 | A1* | 10/2020 | Jeong | G09G 3/3291 |
| 2020/0372861 | A1* | 11/2020 | Ok | G09G 3/3233 |
| 2021/0005146 | A1* | 1/2021 | Kim | G09G 3/3258 |
| 2021/0335234 | A1* | 10/2021 | Yin | G09G 3/3291 |
| 2021/0358418 | A1* | 11/2021 | Shin | G09G 3/3266 |
| 2022/0108656 | A1* | 4/2022 | Lee | G09G 3/3275 |
| 2022/0199018 | A1* | 6/2022 | Jeon | G09G 3/3233 |
| 2022/0199041 | A1* | 6/2022 | Park | G09G 3/3275 |
| 2023/0109170 | A1* | 4/2023 | Lim | G09G 3/3233 345/204 |
| 2023/0137365 | A1* | 5/2023 | Hong | G09G 3/3291 345/690 |
| 2023/0317007 | A1* | 10/2023 | Kim | G06F 3/0412 345/76 |
| 2023/0402577 | A1* | 12/2023 | Lee | H01L 25/0753 |
| 2023/0403898 | A1* | 12/2023 | Kim | H10D 86/451 |
| 2024/0054925 | A1* | 2/2024 | Wei | G09G 3/006 |
| 2024/0071313 | A1* | 2/2024 | Pyun | G09G 3/3266 |
| 2024/0112630 | A1* | 4/2024 | Bae | G09G 3/3233 |
| 2024/0153457 | A1* | 5/2024 | Yin | G09G 3/3233 |
| 2024/0153458 | A1* | 5/2024 | Yin | G09G 3/3233 |
| 2024/0274077 | A1* | 8/2024 | Jeong | G09G 3/3233 |

FOREIGN PATENT DOCUMENTS

| | | |
|---|---|---|
| KR | 10-2022-0093862 | 7/2022 |
| KR | 10-2022-0096041 | 7/2022 |

* cited by examiner

DISPLAY DEVICE AND METHOD TO SENSE ELECTRICAL CHARACTERISTICS OF PIXELS

CROSS-REFERENCE TO RELATED APPLICATION

The present application claims priority under 35 U.S.C. § 119(a) to Korean patent application No. 10-2023-0098486 filed on Jul. 27, 2023 in the Korean Intellectual Property Office, the entire disclosure of which is incorporated herein by reference.

BACKGROUND

Technical Field

The present disclosure generally relates to an electronic device, and more particularly, to a display device and a method to sense electrical characteristics of pixels.

Related Art

Various types of display devices, such as a liquid crystal display device and an organic light emitting display device, have been used.

A display device may include a plurality of pixels, and the plurality of pixels may emit light with various colors and various luminances, thereby displaying various images. The plurality of pixels may include pixel circuits having the substantially same structure.

However, electrical characteristics, such as mobilities and threshold voltages of transistors of pixel circuits may be different from each other due to various reasons, such as a process variation, a use frequency of each pixel, and a degradation degree of each pixel. Threshold voltages of light emitting diodes of pixels PXL may also be different from each other. Accordingly, there is required a scheme for sensing electrical characteristics of pixels, e.g., mobilities, threshold voltages, and the like of transistors, and compensating for different electrical characteristics, when the pixels are driven.

SUMMARY

Embodiments provide a display device and an operating method thereof, which can prevent pixels from unintentionally emitting light in a sensing period for sensing characteristics of the pixels.

In accordance with an aspect of the present disclosure, there is provided a display device including: a display panel including a plurality of pixels arranged along a plurality of rows, wherein the plurality of pixels are connected to data lines and sensing lines; and a display driver configured to receive input image data, and display an image by providing data signals to the plurality of pixels through the data lines, based on the received input image data, wherein the plurality of rows are divided into row groups, and each of the row groups includes at least one row among the plurality of rows, and wherein the display driver is configured to, while selecting each of the plurality of rows, acquire sensing data associated with pixels of the selected row through the sensing lines, and apply an initialization data signal to the plurality of pixels of the plurality of rows through the data lines before the at least one row of each of the row groups is selected.

The row groups may include a first row group and a second row group. The first row group may include one or more first rows among the plurality of rows, and the second row group may include one or more second rows among the plurality of rows. The display driver may be configured to apply the initialization data signal to the plurality of pixels of the plurality of rows through the data lines before the one or more first rows of the first row group are selected.

The display driver may be configured to apply the initialization data signal to the plurality of pixels of the plurality of rows through the data lines before the one or more second rows of the second row group are selected.

Each of the row groups may include two or more rows among the plurality of rows.

Each of the row groups may include one row among the plurality of rows.

The initialization data signal may be a black data voltage corresponding to a black grayscale.

The display driver may include a timing controller, a data driver, and a scan driver. Each of the plurality of pixels may include: a pixel circuit connected to one of the data lines and one of the sensing lines; and a light emitting element connected between a first power source and a second power source, the light emitting element being connected to the first power source through the pixel circuit. The pixel circuit may include a first transistor connected between the first power source and the light emitting element, a second transistor connected between one of the data lines and the first transistor, a first internal node connected between the first transistor and the second transistor, and a second internal node connected between the first transistor and the light emitting element.

In the blank period, the data signals are provided to the plurality of pixels during a display period, and the timing controller boosts the second power source during a blank period different from the display period.

The second transistor of each of the plurality pixels may be turned on, wherein the initialization data signal is applied to the first internal node.

When the initialization data signal is applied to the first internal node, an initialization voltage may be applied to the second internal node.

A voltage of the initialization data signal may be equal to or lower than the initialization voltage.

In accordance with another aspect of the present disclosure, there is provided a method of operating a display device including a plurality of pixels arranged along a plurality of rows, the method including: dividing the plurality of rows into row groups, wherein each of the row groups includes at least one row among the plurality of rows; acquiring sensing data associated with pixels of the selected row through sensing lines in a blank period different from a display period, while selecting each of the plurality of pixels; and applying an initialization data signal to the plurality of pixels of the plurality of rows through data lines before the at least one row of each of the row groups is selected.

The row groups may include a first row group and a second row group. The first row group may include one or more first rows among the plurality of rows, and the second row group may include one or more second rows among the plurality of rows. The applying of the initialization data signal to the plurality of pixels may include applying the initialization data signal to the plurality of pixels of the plurality of rows through the data lines before the one or more first rows of the first row group are selected.

In accordance with another aspect of the present disclosure, there is provided a method of operating a display device including a plurality of pixels arranged along a plurality of rows, the method including dividing the plurality of rows into row groups, wherein each of the row groups includes at least one row among the plurality of rows, acquiring sensing data associated with pixels of the selected row through sensing lines in a blank period different from a display period, while selecting each of the plurality of pixels, and applying an initialization data signal to the plurality of pixels of the plurality of rows through data lines before the at least one row of each of the row groups is selected, wherein the initialization data signal is applied to a first internal node, and an initialization voltage is applied to a second internal node.

A sensing control signal can apply the initialization voltage to the pixels.

The applying of the initialization data signal to the plurality of pixels may include applying the initialization data signal to the plurality of pixels of the plurality of rows through the data lines before the one or more second rows of the second row group are selected.

BRIEF DESCRIPTION OF THE DRAWINGS

Various embodiments will now be described more fully hereinafter with reference to the accompanying drawings; however, they may be embodied in different forms and should not be construed as limiting the inventive concept or scope of the claims to the embodiments set forth herein. Rather, these embodiments are provided so that this disclosure will be thorough and complete, and will fully convey the scope of the example embodiments to those skilled in the art.

In the drawing figures, features and dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Principles and embodiments of the present invention relate to sensing a characteristic of the pixel PXLnm, and adjusting a data signal to control luminance of the light emitting element.

Hereinafter, embodiments of the present disclosure will be described in more detail with reference to the accompanying drawings. The present disclosure is not limited to various embodiments described herein, but may be embodied in various different forms. Rather, embodiments described herein are provided to describe and explain the disclosed contents and to sufficiently transfer the ideas of the disclosure to a person of ordinary skill in the art.

In the specification, when an element is referred to as being "connected" or "coupled" to another element, it can be directly connected or coupled to the another element or be indirectly connected or coupled to the another element with one or more intervening elements interposed therebetween. The technical terms used herein are used for the purpose of illustrating a specific embodiment and not intended to limit the embodiment. It will be understood that when a component "includes" an element, unless there is another opposite description thereto, it should be understood that the component does not exclude another element, but may further include another element. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" can be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are used to distinguish one element from another element. Thus, a "first" element discussed below could also be termed a "second" element without departing from the teachings of the present disclosure.

Figure 1:
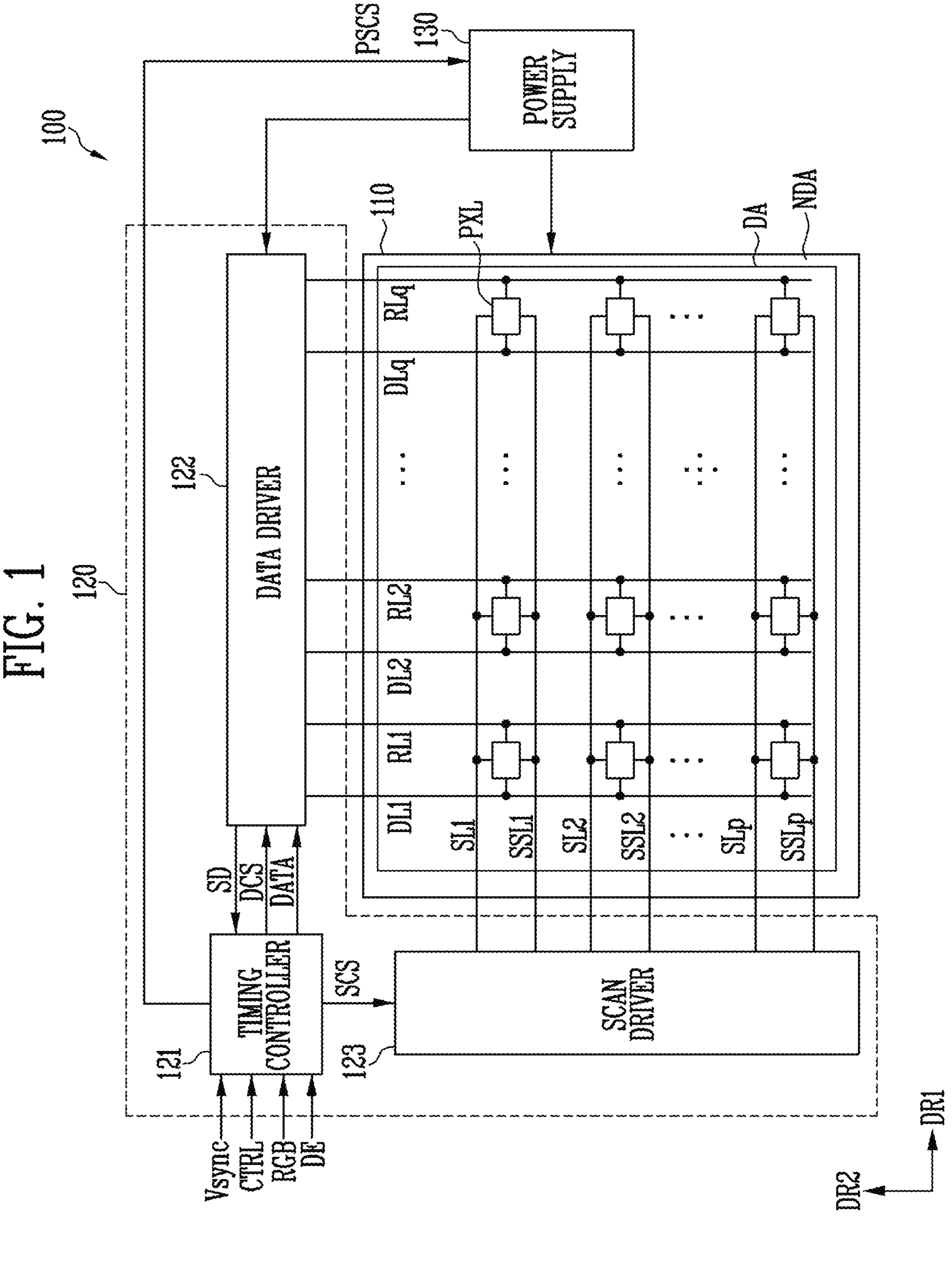
FIG. 1 is a block diagram illustrating an embodiment of a display device.

FIG. 1 is a block diagram illustrating an embodiment of a display device.

Referring to FIG. 1, the display device 100 may include a display panel 110 and a display driver 120.

The display device 100 may be a flat panel display device, a flexible display device, a curved display device, a foldable display device, a bendable display device, or a stretchable display device. Also, the display device 100 may be a transparent display device, a head-mounted display device, or a wearable display device. Also, the display device 100 may be applied to various electronic devices such as a smartphone, a tablet PC, a smart pad, a TV, and/or a monitor.

In various embodiments, the display device 100 may be implemented as a self-luminous display device including a plurality of self-luminous elements. For example, the display device 100 may be an organic light emitting display device including organic light emitting elements, a display device including inorganic light emitting elements, or a display device including light emitting elements configured with a combination of an inorganic material and an organic material. However, this is merely illustrative, and the display device 100 may be implemented as a liquid crystal display device, a plasma display device, a quantum dot display device, or the like.

In various embodiments, the display panel 110 may include a display device DA in which an image is displayed and a non-display device NDA at the periphery of the display device DA, that may surround the display area DA.

In various embodiments, the display panel 110 may include a plurality of pixels PXL, and scan lines SL1 to SLp, sensing control lines SSL1 to SSLp, data lines DL1 to DLq, and sensing lines RL1 to RLq, which are connected to the pixels PXL. The display panel 110 can include a plurality of pixels PXL arranged along a plurality of rows, wherein the plurality of pixels PXL may be connected to data lines and sensing lines. The display panel 110 may display an image by providing data signals to the plurality of pixels PXL. For example, in the display panel 110, the pixels PXL of each row, which are arrange in a first direction DR1, may be commonly connected to a scan line SL extending in the first direction DR1 and a sensing control line SSL extending in the first direction DR1, where the scan line SL and sensing control line SSL can be parallel. Pixels PXL of each column, which are arranged in a second direction DR2, may be commonly connected to a data line DL extending in the second direction DR2 and a sensing line RL extending in the second direction DR2, where the data line DL and sensing line RL can be parallel.

In various embodiments, the plurality of rows may be divided into two or more row groups, where each of the two or more row groups may include at least one row from the plurality of rows. Each of the row groups may include two or more rows from among the plurality of rows. The row groups may include a first row group and a second row group.

Figure 2:
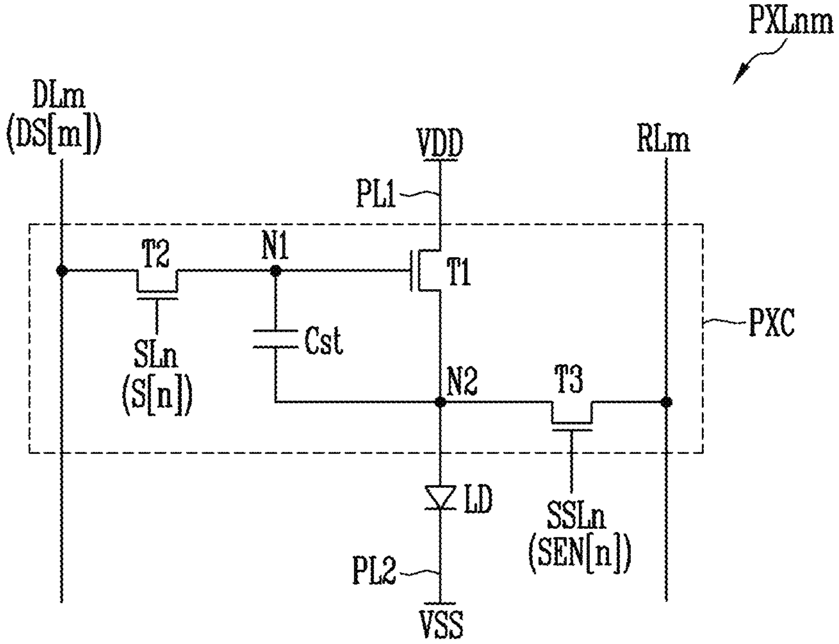
FIG. 2 is a circuit diagram illustrating an embodiment of a pixel shown in FIG. 1.

In various embodiments, each pixel PXL may be connected to a first power source (see e.g., VDD shown in FIG. 2) and a second power source (see e.g., VSS shown in FIG. 2). The pixel PXL may be supplied with a voltage of the first power source VDD and a voltage of the second power source VSS from a power supply 130, which will be described later. The voltage of the first power source VDD may be a high-potential voltage, and the voltage of the second power source VSS may be a voltage having a lower potential than the voltage of the first power source VDD.

In various embodiments, the pixels PXL may include a light emitting element (e.g., an organic light emitting diode), where the light emitting element of the pixels PXL can generate light corresponding to a data signal in response to a current flowing from the first power source to the second power source via the light emitting element. The luminance of the light emitting element may depend on the current flowing from the first power source to the second power source.

In various embodiments, the display driver 120 may include a timing controller 121, a data driver 122, and a scan driver 123. The display driver 120 may be configured to receive input image data, and display an image by providing data signals to the plurality of pixels PXL through the data lines DL1 to DLq, based on the received input image data. In various embodiments, the timing controller 121 may generate control signals for controlling the data driver 122, the scan driver 123, and the power supply 130. For example, the control signals may include a data driver control signal DCS for controlling the data driver 122, a scan driver control signal SCS for controlling the scan driver 123, and a power supply control signal PSCS for controlling the power supply 130.

In various embodiments, the timing controller 121 may generate the data driver control signal DCS, the scan driver control signal SCS, and the power supply control signal PSCS. For example, an external input signal may include a data enable signal DE, a vertical synchronization signal Vsync, and a control signal CTRL.

Also, the timing controller 121 may supply the data driver control signal DCS to the data driver 122, supply the scan driver control signal SCS to the scan driver 123, and supply the power supply control signal PSCS to the power supply 130. The timing controller 121 may boost the second power source VSS during a blank period that is different than display period during which an image may be displayed by the display panel 110.

In various embodiments, the timing controller 121 may receive an image signal RGB from the outside, where the timing controller 121 may convert a data format of the image signal RGB to be suitable for an interface with the data driver 122, thereby generating an image data signal DATA.

In various embodiments, the image data signal DATA may include luminance information of each of the pixels PXL of the display panel 110. The image data signal DATA may be divided into a frame unit. In various embodiments, the data enable signal DE may be a signal for defining a period in which a valid image signal RGB may be input, where the data enable signal DE may include a high level period and a low level period. The timing controller 121 may latch the image signal RGB during a period in which the data enable signal DE maintains at a high level.

In various embodiments, the vertical synchronization signal Vsync may define a frame period. The vertical synchronization signal Vsync may be provided in the form of repeated pulses, and a cycle of the vertical synchronization signal Vsync may correspond to a cycle of the frame period.

In various embodiments, the vertical synchronization signal Vsync may be provided to the timing controller 121. In various embodiments, the timing controller 121 may generate the vertical synchronization signal Vsync in response to the control signal CTRL, where the vertical synchronization signal Vsync may be a signal internally generated in the display device 100.

In various embodiments, the data driver 122 may receive the data driver control signal DCS and the image data signal DATA, which are input from the timing controller 121. The data driver 122 may supply data signals to the data lines DL1 to DLq according to the image data signal DAT. As such, a data signal supplied to each data line may be determined according to the image data signal DATA, and have a data voltage corresponding to a grayscale value of the image data signal DATA.

When a data signal is supplied to a specific data line, a pixel PXL connected to the specific data line may be supplied with the data signal transferred through the corresponding data line. The corresponding pixel PXL may emit light with a luminance corresponding to the supplied data signal based on the luminance information.

In various embodiments, the data driver 122 may supply an initialization voltage from the power supply 130 to a sensing line RL under the control of the timing controller 121. The data driver 122 may receive a sensing current from pixels PXL of a selected row among the pixels PXL through first to $q^{th}$ sensing lines RL1 to RLq. For example, the data driver 122 may receive a sensing current from pixels PXL of one row in a vertical blank period (e.g., a sensing period) between adjacent display periods.

In various embodiments, the data driver 122 may calculate characteristics of the pixels PXL of the selected row, based on the sensing current, and provide the timing controller 121 with sensing data SD corresponding to the calculated characteristics. In various embodiments, the characteristics of the pixels PXL may include at least one of threshold voltages of driving transistors of the pixels PXL, mobilities of the driving transistors, and characteristics of the light emitting elements. The timing controller 121 may compensate for the image signal RGB, based on the sensing data SD, and provide the image data signal DATA to the data driver 122 based on the compensated image signal RGB.

In various embodiments, a sensing unit may be separately included in the display device, so that the sensing line RL may be connected to the sensing unit. The sensing unit may receive a sensing current, and calculate sensing data, and subsequently provide the calculated sensing data to the timing controller 121. Sensing data associated with the pixels PXL of a selected row may be acquired through the sensing lines RL, while selecting each of the plurality of rows. The display driver 120 may be configured to apply an initialization data signal to the plurality of pixels PXL of the plurality of rows through the data lines DL1 to DLq before the one or more first rows of the first row group are selected. The display driver 120 may be configured to apply the initialization data signal to the plurality of pixels of the plurality of rows through the data lines before the one or more second rows of the second row group are selected.

In order for the data driver 122 to be connected to the data lines DL1 to DLq and the sensing lines RL1 to RLq, the data driver 122 may be mounted directly on a substrate on which the pixels PXL are formed, or be connected to the substrate through a separate component, such as a flexible circuit board.

In various embodiments, the scan driver 123 may be supplied with the scan driver control signal SCS from the timing controller 121. The scan driver 123 may generate a scan signal and a sensing control signal in response to the scan driver control signal SCS.

In various embodiments, the scan driver 123 may provide the scan signal to the scan line SL, and provide the sensing control signal to the sensing control line SSL. The scan signal may be set to a gate-on voltage at which a transistor included in the pixel PXL can be turned on. The scan signal may be used to apply a data signal (or data voltage) to the pixel PXL. The sensing control signal may be set to the gate-on voltage at which the transistor included in the pixel PXL can be turned on. The sensing control signal may be used to sense (or extract) a driving current flowing through the pixel PXL or apply the initialization voltage to the pixel PXL. The scan signal and the sensing control signal can be supplied, where waveforms of the scan signal and the sensing control signal may be differently set according to an active period, a sensing period, a vertical blank period, and the like.

In order for the scan driver 123 to be connected to the scan lines SL1 to SLp and the sensing control lines SSL1 to SSLp, the scan driver 123 may be mounted directly on the substrate on which the pixels PXL are formed, or be connected to the substrate through a separate component such as a flexible circuit board.

Although the timing controller 121, the data driver 122, and the scan driver 123 are individually illustrated in FIG. 1, at least some of the components may be integrated, if necessary.

In various embodiments, the power supply 130 may generate the voltage of the first power source VDD, the voltage of the second power source VSS, and the initialization voltage, and supply the voltage of the first power source VDD, the voltage of the second power source VSS, and the initialization voltage to the pixel PXL through power lines. The power lines may be provided in the display panel 110, and the initialization voltage may be supplied to the pixel PXL through the sensing line SL.

In various embodiments, the power supply 130 may control the voltage of the first power source VDD, the voltage of the second power source VSS, and the initialization voltage in response to the power supply control signal PSCS. For example, a voltage of the second power source VSS in a sensing period may be set higher than a voltage of the second power source VSS in a display period.

In an embodiment, the power source 130 may be implemented as a Power Management Integrated Circuit (PMIC), but the present disclosure is not limited thereto. In various embodiments, the power supply 130 may generate only the initialization voltage, supply only the initialization voltage to the pixel PXL, generate the voltage of the first power source VDD and the voltage of the second power source VSS in a separate integrated circuit, and/or supply the voltage of the first power source VDD and the voltage of the second power source VSS to the pixel PXL.

FIG. 2 is a circuit diagram illustrating an embodiment of any one of the pixels shown in FIG. 1. A pixel PXLnm included in an $n^{th}$ pixel row and an $m^{th}$ pixel column is exemplarily illustrated in FIG. 2 (n and m are positive integers).

Referring to FIG. 2, the pixel PXLnm may include a light emitting element LD, a first transistor T1 (or driving transistor), a second transistor T2 (or switching transistor), a third transistor T3 (or sensing transistor), and a storage capacitor Cst.

In various embodiments, a pixel circuit PXC may include the first transistor T1 (or driving transistor), the second transistor T2 (or switching transistor), the third transistor T3 (or sensing transistor), and the storage capacitor Cst. The first transistor T1 may be connected to a first power line PL1, where the first transistor T1 can supply current to the light emitting element LD. The second transistor T2 may be connected to a scan line SLn. The third transistor T3 may be connected to a sensing line RLm. The pixel circuit PXC may be connected to one of the data lines DL1 to DLq and one of the sensing lines RL1 to RLq. The pixel circuit PXC may include a first transistor T1 connected between the first power source VDD and the light emitting element, a second transistor T2 connected between one of the data lines and the first transistor T1, a first internal node connected between the first transistor T1 and the second transistor T2, and a second internal node connected between the first transistor T1 and the light emitting element. The second transistor of each of the plurality pixels may be turned on, so that the initialization data signal is applied to a first internal node. An initialization data signal may be applied to the first internal node, and an initialization voltage may be applied to the second internal node.

In various embodiments, the light emitting element LD may generate light with a predetermined luminance corresponding to an amount of current supplied from the first transistor T1. The light emitting element LD may include a first electrode and a second electrode. The first electrode may be connected to the second node N2, and the second electrode may be connected to a second power line PL2 to which the voltage of the second power source VSS is applied. In an embodiment, the first electrode may be an anode, and the second electrode may be a cathode. In various embodiments, the first electrode may be the cathode, or the second electrode may be the anode.

In an embodiment, the light emitting element LD may be an inorganic light emitting element formed of an inorganic material. In various embodiments, the light emitting element LD may be an organic light emitting diode including an organic light emitting layer. Also, the light emitting element LD may be a light emitting element configured with a combination of an inorganic material and an organic material.

In various embodiments, a first electrode of the first transistor T1 may be connected to a first power line PL1 to which the voltage of the first power source VDD, and a second electrode of the first transistor T1 may be connected to the first electrode of the light emitting element LD (or the second node N2). A gate electrode of the first transistor T1 may be connected to a first node N1. In an embodiment, the first electrode may be a drain electrode, and the second electrode may be a source electrode. The In various embodiments, the first transistor T1 may control an amount of current flowing through the light emitting element LD, corresponding to a voltage of the first node N1. The first transistor T1 may be turned on when a voltage (i.e., a gate-source voltage) between the first node N1 and the second node N2 is higher than a threshold voltage.

In various embodiments, a first electrode of the second transistor T2 may be connected to an $m^{th}$ data line DLm, and a second electrode of the second transistor T2 may be connected to the first node N1 (or the gate electrode of the first transistor T1). A gate electrode of the second transistor T2 may be connected to an $n^{th}$ scan line SLn. The second transistor T2 may be turned on when a scan signal S[n] (e.g., a high level voltage) is supplied to the $n^{th}$ scan line SLn, to transfer a data voltage DATA from the $m^{th}$ data line DLm to the first node N1.

In various embodiments, a first electrode of the third transistor T3 may be connected to an $m^{th}$ sensing line RLm, and a second electrode of the third transistor M3 may be connected to the second node N2 (or the second electrode of the first transistor T1). A gate electrode of the third transistor T3 may be connected to an $n^{th}$ sensing control line SSLn. The third transistor T3 may be turned on when a sensing control signal SEN[n] (e.g., a high level voltage) is supplied to the $n^{th}$ sensing control line SSLn, to electrically connect the $m^{th}$ sensing line RLm and the second node N2 to each other. Accordingly, the initialization voltage may be provided to the second node N2 for a predetermined time. However, the present disclosure is not limited thereto, and a sensing current (or sensing voltage) corresponding to a node voltage of the second node N2 may be transferred to the $m^{th}$ sensing line RLm. The sensing voltage may be provided to the data driver 122 (see FIG. 1) through the $m^{th}$ sensing line RLm.

In various embodiments, the storage capacitor Cst may be connected between the first node N1 and the second node N2. The storage capacitor Cst may charge a data voltage DATA corresponding to a data signal supplied to the first node N1 during one frame. Accordingly, the storage capacitor Cst may store a voltage corresponding to a voltage difference between the first node N1 and the second node N2. When the data voltage DATA is supplied, the initialization voltage may be supplied to the second node N2, and the storage capacitor Cst may store a difference voltage between the data voltage DATA and the initialization voltage. Whether the first transistor T1 is to be turned on or turned off may be determined according to a voltage stored in the storage capacitor Cst. A circuit structure of the pixel PXL is not intended to be limited by FIG. 2 or the corresponding description.

In an example, the light emitting element LD may be located between the first power line PL1 connected to the first power source VDD and the first electrode of the first transistor T1.

Although a case where the transistors are NMOS transistors is illustrated in FIG. 2, the present disclosure is not limited thereto. In an example, at least one of the first to third transistors T1, T2, and T3 may be implemented with a PMOS transistor. In addition, the first to third transistors T1, T2, and T3 shown in FIG. 2 may be implemented with a thin film transistor including at least one of an oxide semiconductor, an amorphous silicon semiconductor, or a polycrystalline silicon semiconductor.

Figure 3:
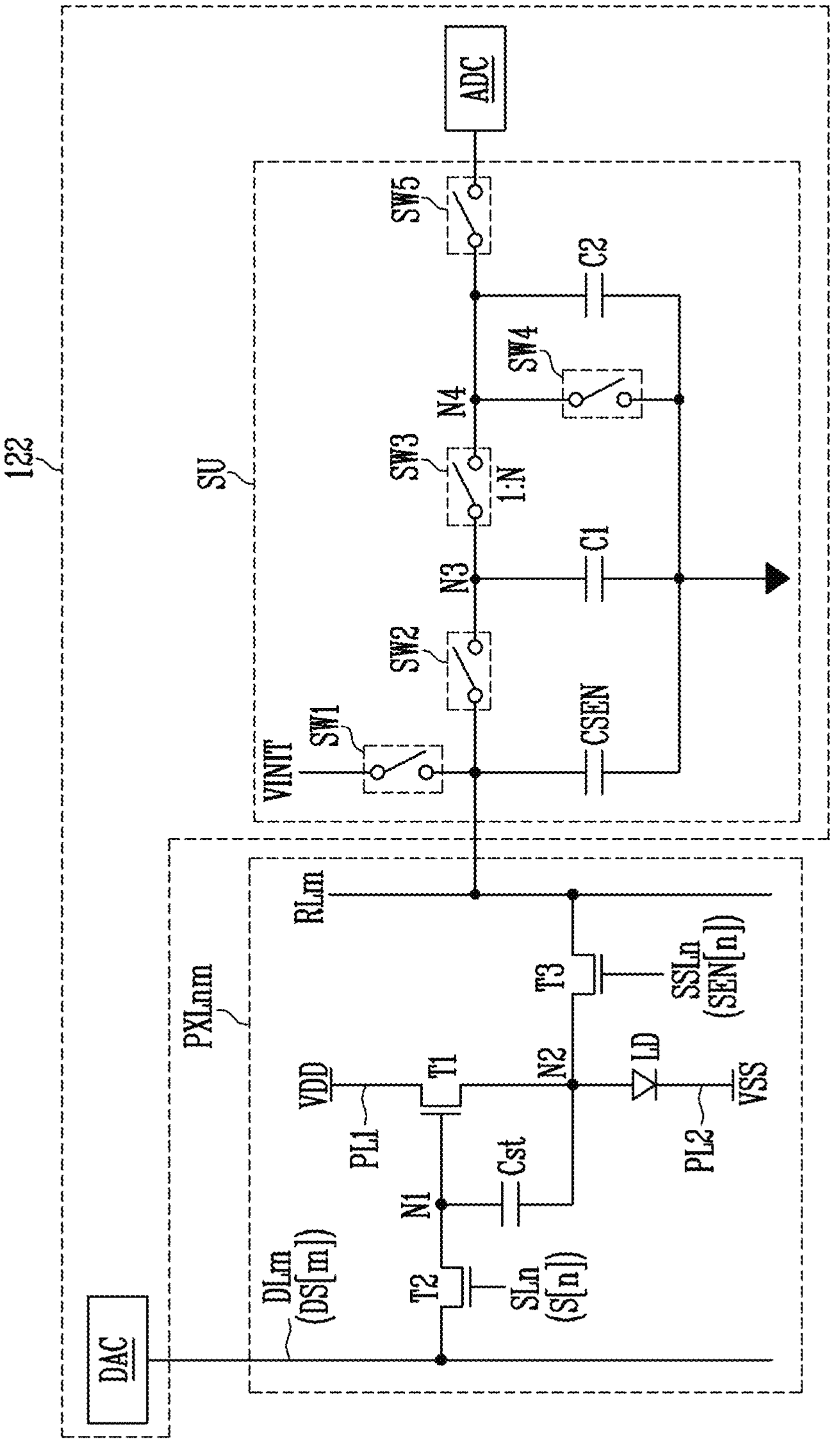
FIG. 3 is a circuit diagram illustrating an embodiment of a sensing unit connected to the pixel shown in FIG. 2.

FIG. 3 is a circuit diagram illustrating an embodiment of a sensing unit connected to the pixel shown in FIG. 2. In FIG. 3, the data driver 122 is briefly illustrated based on a portion of the data driver 122 connected to a pixel PXLnm through the $m^{th}$ sensing line RLm, to sense a characteristic of the pixel PXLnm. The pixel PXLnm shown in FIG. 3 is identical to the pixel PXLnm described with reference to FIG. 2, and therefore, overlapping descriptions related to the pixel PXLnm will be omitted.

Referring to FIG. 3, the data driver 122 may include a digital-to-analog converter DAC. The digital-to-analog converter DAC may generate a data voltage corresponding to a data value included in frame data (or image data). For example, the digital-to-analog converter DAC may select one of gamma voltages, based on the data value, and output the selected gamma voltage as a data voltage. Meanwhile, the data driver 122 may further include an output buffer, and provide the data voltage to the $m^{th}$ data line DLm through the output buffer.

In various embodiments, the data driver 122 may further include a sensing unit SU connected to the $m^{th}$ sensing line RLm and an analog-to-digital converter ADC.

In various embodiments, the sensing unit SU may include an initialization switch SW1, a sensing capacitor CSEN, a sampling switch SW2, a first capacitor C1, a sharing switch SW3, a reset switch SW4, a second capacitor C2, and an output switch SW5.

In various embodiments, the initialization switch SW1 may be connected between a power line to which an initialization voltage VINIT is applied and the $m^{th}$ sensing line RLm. The initialization voltage VINIT may be provided from the power supply 130 (see FIG. 1), and have a voltage level lower than a voltage level of a voltage at which the light emitting element LD can be operated. When the initialization switch SW1 is turned on, the initialization voltage VINIT may be applied to the $m^{th}$ sensing line RLm. When the third transistor T3 of the pixel PXLnm is turned on, the initialization voltage VINIT may be applied to the second node N2 of the pixel PXLnm. Since the initialization voltage VINIT has a voltage level lower than the voltage level of the voltage at which the light emitting element LD can be operated, the light emitting element LD may not emit light even when the first transistor T1 is turned on.

In various embodiments, the sensing capacitor CSEN may be connected between the $m^{th}$ sensing line RLm and a reference power source. The reference power source may have a ground voltage, but the present disclosure is not limited thereto. When the initialization switch SW1 is turned off and the third transistor T3 of the pixel PXLnm is turned on, the sensing capacitor CSEN may be charged by a sensing current provided through the second node N2. That is, characteristic information of the pixel PXLnm, which is provided through the second node N2, may be stored in the sensing capacitor CSEN.

In various embodiments, the sampling switch SW2 may be connected between the $m^{th}$ sensing line RLm and a third node N3. The first capacitor C1 may be connected between the third node N3 and the reference power source. While the sampling switch SW2 is turned on, the first capacitor C1 may sample the characteristic information of the pixel PXLnm (or the first transistor T1), which is stored in the sensing capacitor CSEN. That is, the data driver 122 may sample a sensing signal through the sampling switch SW2 and the first capacitor CL.

In various embodiments, the sharing switch SW3 may be connected between the third node N3 and a fourth node N4, the reset switch SW4 may be connected between the fourth node N4 and the reference power source, and the second capacitor C2 may be connected between the fourth node N4 and the reference power source. When the sharing switch SW3 is turned on, and the first capacitor C1 and the second capacitor C2 share charges, a node voltage of the fourth node N4 (and a node voltage of the third node N3) may be changed. The sharing switch SW3, the reset switch SW4, and the second capacitor C2 may serve as a buffer according to operations of the sharing switch SW4 and the second capacitor C2. Although a gain of the buffer vary according to a capacitance ratio of the first capacitor C1 and the second capacitor C2, the gain of the buffer may be N (N is an integer greater than 1). The sharing switch SW3, the reset switch SW4, and the second capacitor C2 may amplify the node voltage of the third node N3.

In various embodiments, the output switch SW5 may be connected between the fourth node N4 and the analog-to-digital converter ADC, and connect the fourth node N4 to an input terminal of the analog-to-digital converter ADC. The node voltage of the fourth node N4 may be applied to the analog-to-digital converter ADC.

Although not shown in the drawing, the sensing unit SU may further include a capacitor connected between the input terminal of the analog-to-digital converter ADC and the reference power source to maintain the node voltage of the fourth node N4, which is provided to the analog-to-digital converter ADC, and an initialization circuit for initializing the input terminal of the analog-to-digital converter ADC (or the capacitor) (e.g., a capacitor initialization power source and a switch connecting the capacitor initialization power source to the input terminal of the analog-to-digital converter ADC).

In various embodiments, the analog-to-digital converter ADC may convert a voltage provided to the input terminal thereof into a data value (e.g., a digital code). That is, the data driver 122 may convert a sensing signal in an analog form, which is sampled through the analog-to-digital converter ADC, into a sensing signal in a digital form. The sensing signal in the digital form (e.g., sensing data) may be provided to the timing controller 121.

In various embodiments, although a case where the sensing unit SU is configured to include the capacitors CSEN, C1, and C2 and the switches SW1, SW2, SW3, SW4, and SW5 is illustrated in FIG. 3, this is merely illustrative, and the present disclosure is not limited thereto. For example, when the sensing unit SU is able to detect a voltage (or a current corresponding thereto) of the second node N2 of the pixel PXLnm, various circuits (e.g., a sensing circuit which converts a sensing current into a sensing voltage, using an amplifier, and samples and holds the converted sensing voltage) may be implemented as the sensing unit SU.

Figure 4:
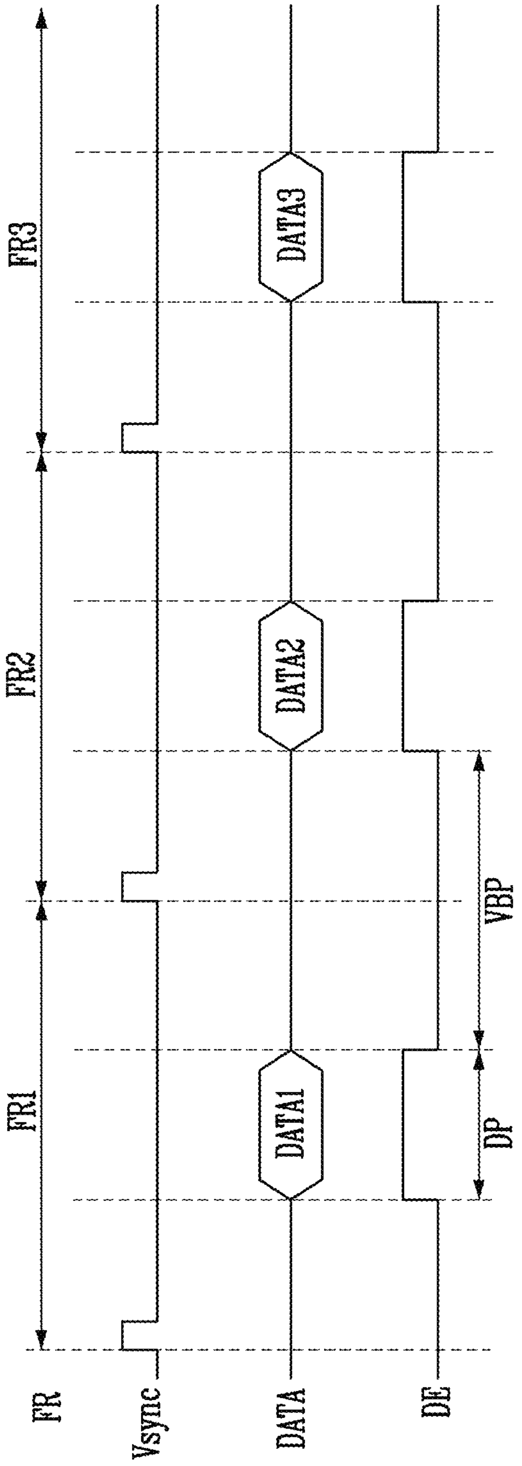
FIG. 4 is a timing diagram illustrating an embodiment of signals associated with a display driver shown in FIG. 1.

FIG. 4 is a timing diagram illustrating an embodiment of signals associated with the display driver shown in FIG. 1.

Referring to FIG. 4, each frame period FR may include a display period DP in which the display panel 110 displays an image and a vertical blank period VBP in which the display panel 110 does not display the image.

In various embodiments, the vertical synchronization signal Vsync may define the frame period FR. The vertical synchronization signal Vsync may include a high level period and a low level period, and a cycle of the vertical synchronization signal Vsync may correspond to a cycle of the frame period.

In addition, a time at which the level of the vertical synchronization signal Vsync is changed to a high level may correspond to a time at which the frame period FR is started.

During a period in which the data enable signal DE maintains the high level, the image signal RGB shown in FIG. 1 may be received. The data enable signal DE may define the vertical blank period BP and the display period DP. For example, the data enable signal DE may have the high level in the display period DP, and have a low level in the vertical blank period VBP. As such, the vertical blank period VBP may be disposed between display periods.

Electrical characteristics of the pixel PXL (see FIG. 1) may be sensed in the vertical blank period VBP.

Figure 5:
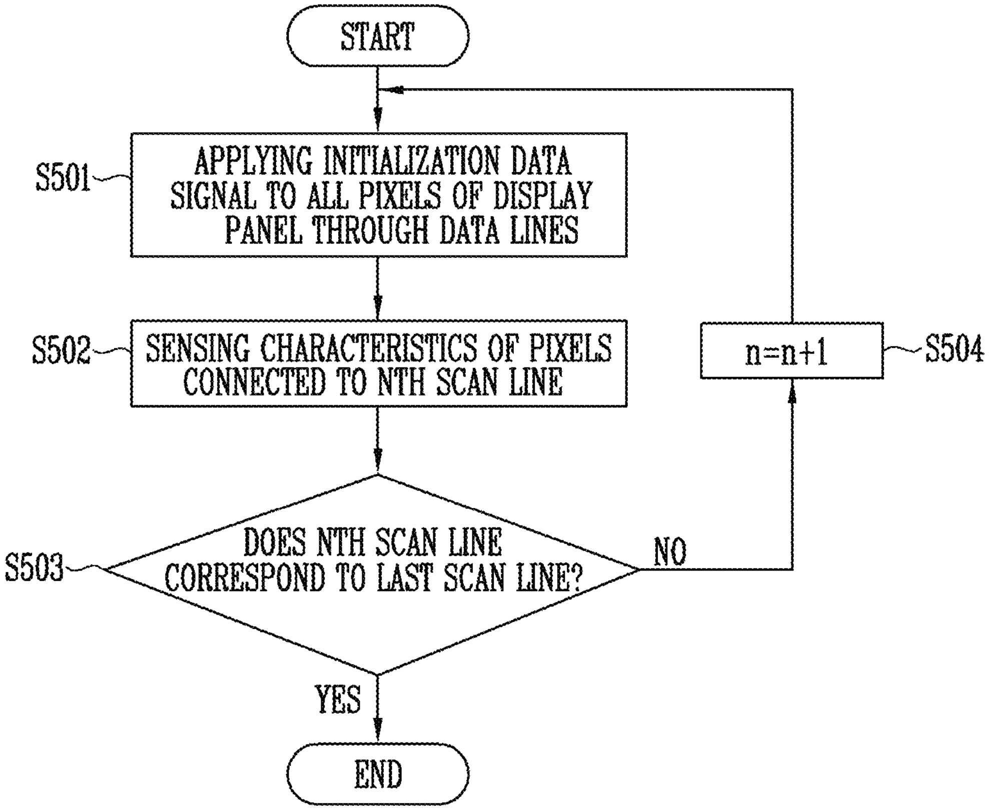
FIG. 5 is a flowchart illustrating a method of sensing electrical characteristics of the pixels.

FIG. 5 is a flowchart illustrating a method of sensing electrical characteristics of the pixels.

Referring to FIGS. 1, 2, and 5, in S501, an initialization data signal may be applied to first nodes N1 of pixels PXL connected to first to $p^{th}$ scan lines, and an initialization voltage may be supplied to second nodes N2 of the pixels PXL.

In S502, electrical characteristics of pixels PXL connected to an $n^{th}$ scan line SLn may be sensed (n is an integer of 1 or more and p or less). For example, electrical characteristics such as mobilities and threshold voltages of transistors of pixels PXL may be different from each other due to various reasons such as a process variation, a use frequency of each pixel, and a degradation degree of each pixel. As well known in this field, characteristics of the pixels PXL connected to the $n^{th}$ scan line SLn may be sensed using various methods.

In S503, it is determined whether the $n^{th}$ scan line SLn corresponds to a last scan line SLp of the display panel 110. When the $n^{th}$ scan line SLn corresponds to the last scan line SLp, a sensing operation may be ended.

When the $n^{th}$ scan line SLn does not correspond to the last scan line SLp, in S504, an (n+1)th scan line SL(n+1) as a next scan line may be selected as the $n^{th}$ scan line SLn.

Subsequently, S501 to S503 may be re-performed.

Figure 6:
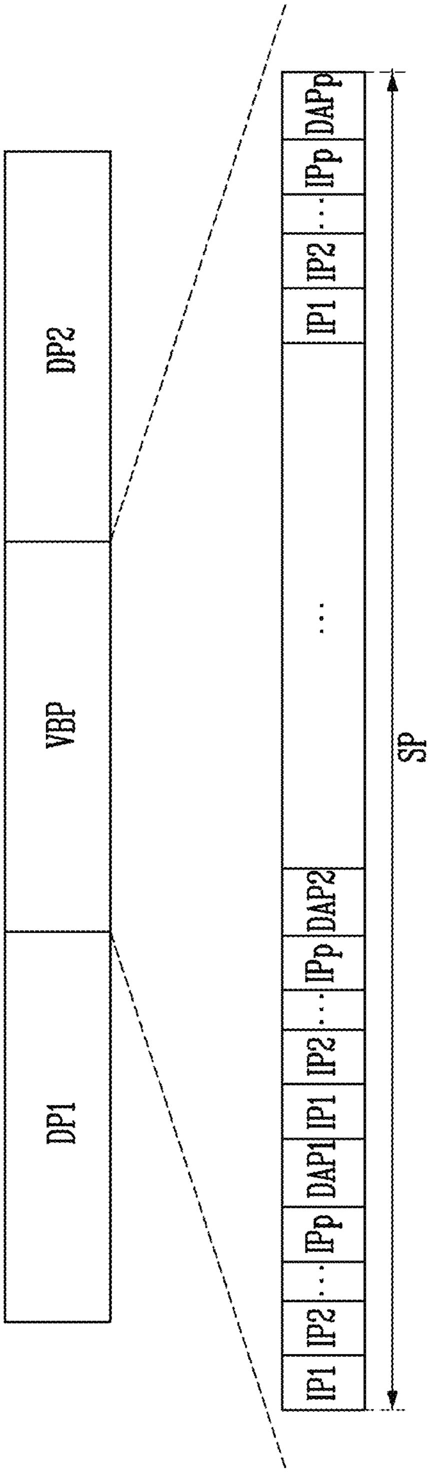
FIG. 6 is a timing diagram illustrating an embodiment of the method of sensing the electrical characteristics of the pixels, which is shown in FIG. 5.

FIG. 6 is a timing diagram illustrating an embodiment of the method of sensing the electrical characteristics of the pixels, which is shown in FIG. 5.

As described with reference to FIG. 4, a vertical blank period VBP may be disposed between adjacent display periods. For example, as shown in FIG. 6, a vertical blank period VBP may be provided between a first display period DP1 and a second display period DP2.

Referring to FIGS. 1, 2, and 6, the vertical blank period VBP may include a sensing period SP for sensing a characteristic of at least one pixel PXL.

The sensing period SP may include first to $p^{th}$ initialization periods IP1 to IPp for initializing pixels PXL connected to first to $p^{th}$ scan lines SL1 to SLp and first to $p^{th}$ sensing data acquisition period DAP1 to DAPp for sensing characteristics of the pixels PXL connected to the first to $p^{th}$ scan lines SL1 to SLp.

First, the first to $p^{th}$ initialization periods IP1 to IPp may be provided.

When the first initialization period IP1 for pixels PXL connected to the first scan line SL1 is started, the timing controller 121 may supply the scan driver control signal SCS to the scan driver 123, and supply the data driver control signal DCS to the data driver 122. Accordingly, the scan driver 123 may operate in response to the scan driver control signal SCS, and the data driver 122 may operate in response to the data driver control signal DCS.

In various embodiments, the data driver 122 may apply an initialization data signal as data signals to the data lines DL1 to DLq. The initialization data signal may be a black data voltage corresponding to a black grayscale. The initialization data signal may be equal to or lower than the initialization voltage VINIT shown in FIG. 3. The initialization data signal may be applied to the plurality of pixels PXL of the plurality of rows through the data lines DL1 to DLq before at least one row of each of the row groups is selected, or before the one or more second rows of the second row group are selected. The row groups may include a first row group and a second row group, where an initialization data signal may be sent to the plurality of pixels of the plurality of rows through the data lines before the row of each of the row groups is selected.

In various embodiments, the scan driver 123 may apply a scan signal to the first scan line SL1. When the scan signal having a high level voltage is supplied, second transistors T2 of pixels PXL of a first row may be turned on.

Also, the scan driver 123 may apply a sensing control signal to a first sensing control line SSL1. When the sensing control signal having a high level voltage is supplied, third transistors T3 of the pixels PXL of the first row may be turned on. The data driver 122 may turn on the initialization switch SW1 of the sensing unit SU.

As the second transistors T2 of the pixels PXL of the first row are turned on, the initialization data signal may be applied to first nodes N1 of the pixels PXL connected to the first scan line SL1.

As the third transistors T3 of the pixels PXL of the first row are turned on, and initialization switches SW1 of sensing units SU connected to the corresponding pixels PXL are turned on, the initialization voltage VINIT may be supplied to second nodes N2 of the pixels PXL connected to the first scan line SL1.

When the first initialization period IP1 is ended, the second initialization period IP2 for pixels PXL connected to the second scan line SL2 may be started.

When the second initialization period IP2 for the pixels PXL connected to the second scan line SL2 is started, the timing controller 121 may supply the scan driver control signal SCS to the scan driver 123, and supply the data driver control signal DCS to the data driver 122. Accordingly, the scan driver 123 may operate in response to the scan driver control signal SCS, and the data driver 122 may operate in response to the data driver control signal DCS.

The data driver 122 may apply an initialization data signal as data signals to the data lines DL1 to DLq. The initialization data signal may be a black data voltage corresponding to a black grayscale.

The scan driver 123 may apply the scan signal to the second scan line SL2. When the scan signal having the high level voltage is supplied, second transistors T2 of pixels PXL of a second row may be turned on.

Also, the scan driver 123 may apply the sensing control signal to a second sensing control line SSL2. When the sensing control signal having the high level voltage is supplied, third transistors T3 of the pixels PXL of the second row may be turned on. The data driver 122 may turn on the initialization switch SW1 of the sensing unit SU.

As the second transistors T2 of the pixels PXL of the second row are turned on, the initialization data signal may be applied to first nodes N1 of the pixels PXL connected to the second scan line SL2.

As the third transistors T3 of the pixels PXL of the second row are turned on, and initialization switches SW1 of sensing units SU connected to the corresponding pixels PXL are turned on, the initialization voltage VINIT may be supplied to second nodes N2 of the pixels PXL connected to the second scan line SL2.

When the second initialization period IP2 is ended, the third initialization period IP3 for pixels PXL connected to the third scan line SL3 may be started.

The third to $p^{th}$ initialization periods IP3 to IPp for pixel rows connected to the third to $p^{th}$ scan lines SL3 to SLp may be performed in the same manner of each of the first and second initialization periods IP1 and IP2. As such, first nodes N1 and second nodes N2 of respective pixels connected to the first to $p^{th}$ scan lines SL1 to SLp may be initialized.

The first sensing data acquisition period DAP1 for the pixels PXL connected to the first scan line SL1 is started.

The data driver 122 may apply a reference voltage to the data lines DL1 to DLq. The reference voltage may be a voltage having a magnitude to a degree to which light emitting elements LD are not turned on.

The scan driver 123 may apply the scan signal to the first scan line SL1. When the scan signal having the high level voltage is supplied, the second transistors T2 of the pixels PXL connected to the first scan line SL1 may be turned on.

Also, the scan driver 123 may apply the sensing control signal to the first sensing control line SSL1. When the sensing control signal having the high level voltage is supplied, third transistors T3 of pixels PXL connected to the first sensing control line SSL1 may be turned on. The data driver 122 may turn on the initialization switch SW1 of the sensing unit SU (see FIG. 3).

As the second transistors T2 of the pixels PXL of the first row are turned on, the reference voltage may be applied to the first nodes N1 of the pixels PXL connected to the first scan line SL1.

As the third transistors T3 of the pixels PXL of the first row are turned on, and the initialization switches SW1 of sensing units SU connected to the corresponding pixels PXL are turned on, the initialization voltage VINIT may be supplied to the second nodes N2 of the pixels PXL connected to the first scan line SL1.

After that, the initialization switches SW1 of the sensing units SU may be turned off. For example, the second nodes N2 may be floated.

The data driver 122 may receive a sensing current from the pixels PXL connected to the first scan line SL1 through the sensing lines RL1 to RLq.

The data driver 122 may calculate characteristics of transistors of the pixels PXL connected to the first scan line SL1, based on the sensing current. The data driver 122 may provide the timing controller 121 with sensing data SD (see FIG. 1) corresponding to the calculated characteristics.

In this manner, the first to $p^{th}$ initialization periods IP1 to IPp and one sensing data acquisition period may be performed. For example, the first to $p^{th}$ initialization period IP1 to IPp may be performed before the second sensing data acquisition period DAP2, and the first to $p^{th}$ initialization period IP1 to IPp may be performed before the $p^{th}$ sensing data acquisition period DAPp. As such, in accordance with an embodiment of the present disclosure, the first to $p^{th}$ initialization period IP1 to IPp may be performed before an $n^{th}$ sensing data acquisition period DAPn (n is an integer which is greater than or equal to 1 and is smaller than or equal to p).

When the first to $p^{th}$ initialization period IP1 to IPp are not provided before each sensing data acquisition period, at least some of the first to $p^{th}$ initialization period IP1 to IPp may be consecutively performed. Pixels PXL may unintentionally emit light in at least some of the first to $p^{th}$ sensing data acquisition periods DAP1 to DAPp. For example, when the first nodes N1 of the pixels PXL are not initialized, voltages of the first nodes N1 of the pixels PXL may unintentionally increase in each sensing data acquisition period. For example, the voltages of the first nodes N1 may unintentionally increase due to coupling or parasitic capacitance between the first nodes N1 of the pixels PXL and the first power source VDD. Accordingly, bright spots may be viewed from the pixels PXL.

In accordance with the embodiment of the present disclosure, the first to $p^{th}$ initialization periods IP1 to IPp may be performed before the $n^{th}$ sensing data acquisition period DAPn. Accordingly, the pixels PXL do not unintentionally emit light in the sensing period SP. In addition, electrical characteristics of the pixels PXL can be reflected on the sensing data SD with improved reliability according to the first to $p^{th}$ initialization periods IP1 to IPp.

In embodiments, the timing controller 121 may supply the power supply control signal PSCS to the power supply 130 such that the voltage of the second power source VSS increases in the sensing period SP. The second power source VSS may be boosted during the vertical blank period VBP, where the vertical blank period VBP may include a sensing period SP for sensing a characteristic of at least one pixel PXL. For example, the voltage of the second power source VSS may be controlled to increase during the first to $p^{th}$ initialization periods IP1 to IPp. A level of the second power source VSS in the first to $p^{th}$ initialization periods IP1 to IPp may be higher than a level of the second power source VSS in the first to $p^{th}$ sensing data acquisition periods DAP1 to DAPp. This means that voltages of cathodes of the light emitting elements LD of the pixels PXL decrease. A light emitting element may be connected between the first power source VDD and the second power source VSS, with the light emitting element being connected to the first power source VDD through the pixel circuit PXC. Accordingly, the pixels PXL do not unintentionally emit light in the sensing period SP.

Figure 7:
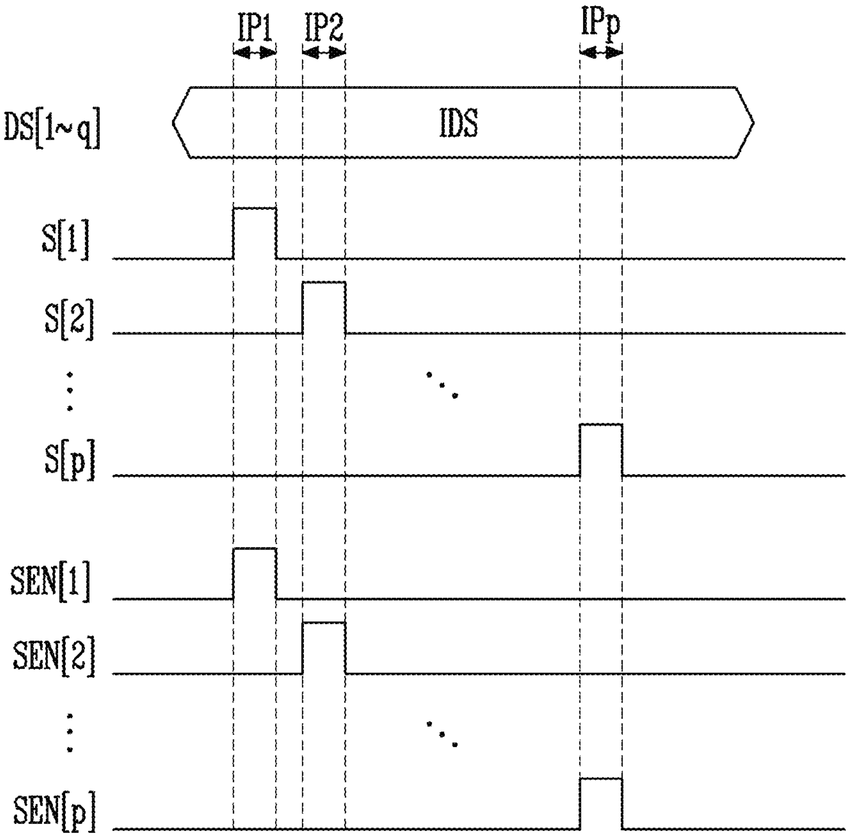
FIG. 7 is a timing diagram illustrating an embodiment of first to $p^{th}$ initialization periods shown in FIG. 6.

FIG. 7 is a timing diagram illustrating an embodiment of the first to $p^{th}$ initialization periods shown in FIG. 6.

Referring to FIGS. 1, 2 and 7, when the first initialization period IP1 for pixels PXL connected to the first scan line SL1 is started, the timing controller 121 may supply the scan driver control signal SCS to the scan driver 123, and supply the data driver control signal DCS to the data driver 122. Accordingly, the scan driver 123 may operate in response to the scan driver control signal SCS, and the data driver 122 may operate in response to the data driver control signal DCS.

In various embodiments, the data driver 122 may apply an initialization data signal IDS as data signals DS[1 to q] to the data lines DL1 to DLq. The initialization data signal IDS may be a black data voltage corresponding to a black grayscale.

In various embodiments, the scan driver 123 may apply a scan signal S[1] to the first scan line SL1. When the scan signal S[1] having the high level voltage is supplied, the second transistors T2 of the pixels PXL of the first row may be turned on.

Also, the scan driver 123 may apply a sensing control signal SEN[1] to the first sensing control line SSL1. When the sensing control signal SEN[1] having the high level voltage is supplied, the third transistors T3 of the pixels PXL of the first row may be turned on.

The data driver 122 may turn on the initialization switch SW1 of the sensing unit SU.

As the second transistors T2 of the pixels PXL of the first row are turned on, the initialization data signal may be applied to the first nodes N1 of the pixels PXL connected to the first scan line SL1.

As the third transistors T3 of the pixels PXL of the first row are turned on, initialization switches SW1 of sensing units SU (see FIG. 3) connected to the corresponding pixels PXL are turned on, the initialization voltage VINIT may be supplied to the second nodes N2 of the pixels PXL connected to the first scan line SL1. A voltage of the initialization data signal may be equal to or lower than the initialization voltage.

When the first initialization period IP1 is ended, the second initialization period IP2 for the pixels PXL connected to the second scan line SL2 may be started.

In the second initialization period IP2, a scan signal S[2] may be applied to the second scan line SL2, and a sensing control signal SEN[2] may be applied to the second sensing line SSL2. The second initialization period IP2 for the pixels PXL connected to the second scan line SL2 may be performed in the same manner as the first initialization period IP1.

In the $p^{th}$ initialization period IPp, a scan signal S[p] may be applied to the $p^{th}$ scan line SLp, and a sensing control line SEN[p] may be applied to a $p^{th}$ sensing control line SSLp. The $p^{th}$ initialization period IPp for pixels PXL connected to the $p^{th}$ scan line SLp may be performed in the same manner as the first initialization period IP1.

As such, the first nodes N1 and the second nodes N2 of the respective pixels connected to the first to $p^{th}$ scan lines SL1 to SLp may be initialized. The initialization data signal may be applied to ae first internal node, and an initialization voltage may be applied to the second internal node.

Figure 8:
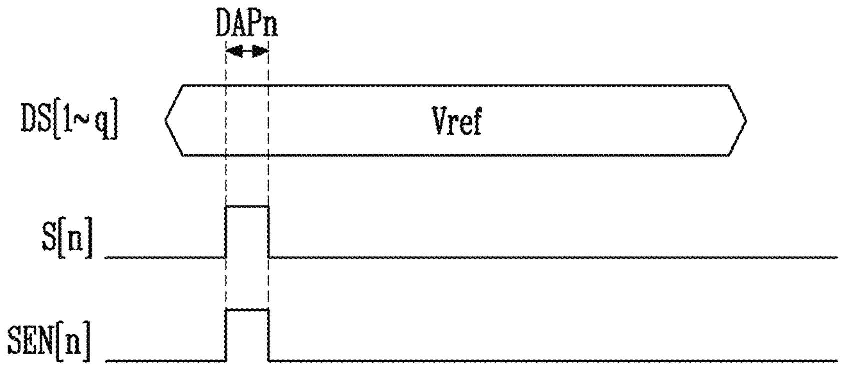
FIG. 8 is a timing diagram illustrating an embodiment of an $n^{th}$ sensing data acquisition period shown in FIG. 7.

FIG. 8 is a timing diagram illustrating an embodiment of the $n^{th}$ sensing data acquisition period shown in FIG. 7.

Referring to FIGS. 1, 2, and 8, an $n^{th}$ sensing data acquisition period DAPn for pixels PXL connected to an $n^{th}$ scan line SLn is started.

The data driver 122 may apply a reference voltage Vref to the data lines DL1 to DLq. The reference voltage Vref may be a voltage having a magnitude to a degree to which light emitting element LD are not turned on.

The scan driver 123 may apply a scan signal S[n] to the $n^{th}$ scan line SLn. When the scan signal S[n] having the high level voltage is supplied, second transistors T2 of the pixels PXL connected to the $n^{th}$ scan line SLn may be turned on.

Also, the scan driver 123 may apply a sensing control signal SEN[n] to an $n^{th}$ sensing control line SSLn. When the sensing control signal SEN[n] having the high voltage level is supplied, third transistors T3 of pixels PXL connected to the $n^{th}$ sensing line SSLn may be turned on. The data driver 122 may turn on the initialization switch SW1 of the sensing unit SU (see FIG. 3).

As second transistors T2 of pixels PXL of an $n^{th}$ row are turned on, the reference voltage Vref may be applied to first nodes N1 of the pixels PXL connected to the $n^{th}$ scan line SLn.

As third transistors T3 of the pixels of the $n^{th}$ row are turned on, and initialization switches SW1 of sensing units SU connected to the corresponding pixels PXL are turned on, the initialization voltage VINT may be supplied to second nodes N2 of the pixels PXL connected to the $n^{th}$ scan line SLn.

After that, the initialization switches SW1 of the sensing units SU may be turned off. For example, the second nodes N2 may be floated.

In various embodiments, the data driver 122 may receive a sensing current from the pixels PXL connected to the $n^{th}$ scan line SLn through the sensing lines RL1 to RLq.

In various embodiments, the data driver 122 may calculate characteristics of transistors of the pixels PXL connected to the $n^{th}$ scan line SLn, based on the sensing current. The data driver 122 may provide the timing controller 122 with sensing data SD (see FIG. 1) corresponding to the calculated characteristics.

Figure 9:
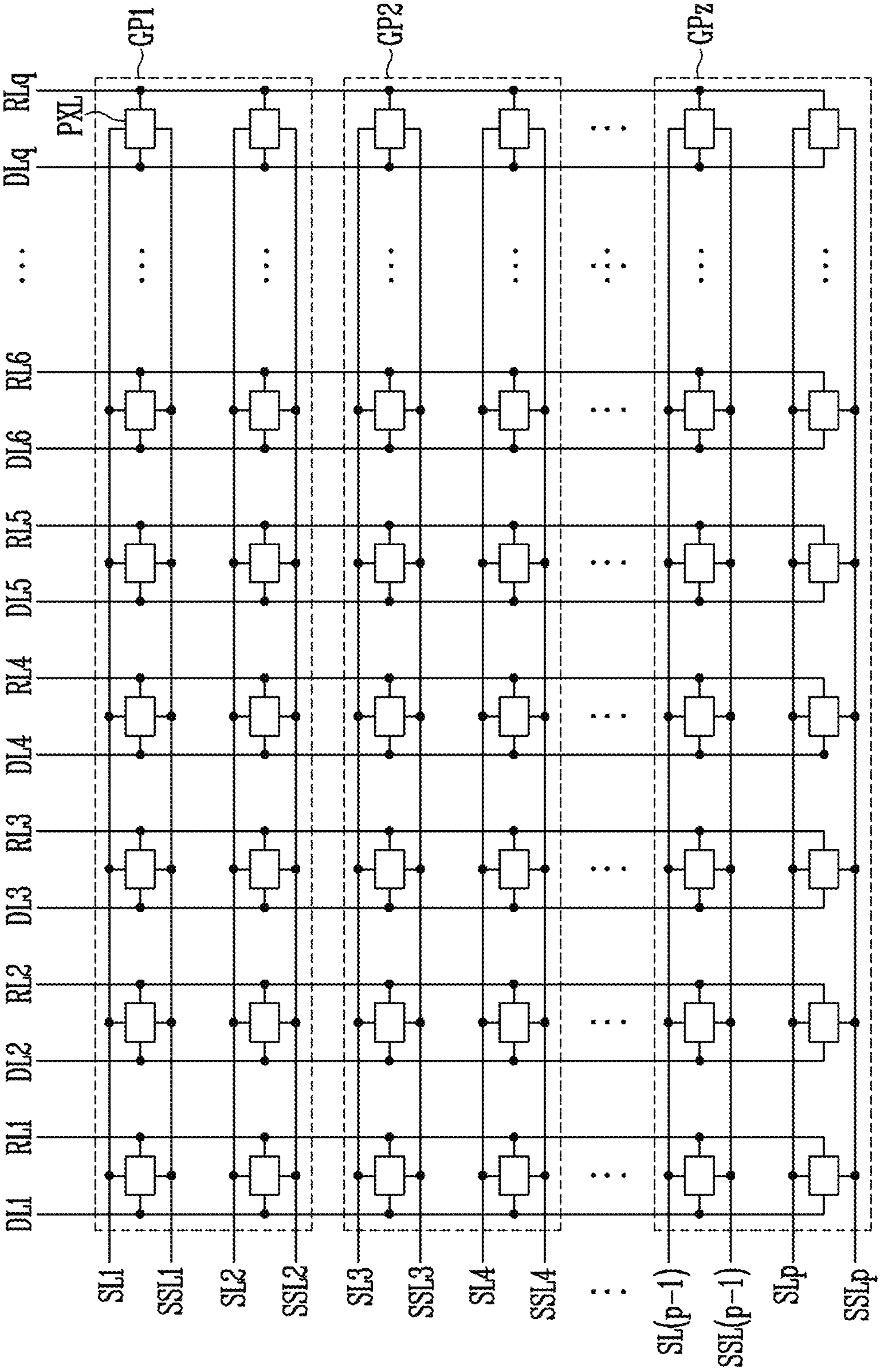
FIG. 9 is a block diagram illustrating an embodiment of a display panel shown in FIG. 1.

FIG. 9 is a block diagram illustrating an embodiment of the display panel shown in FIG. 1.

Referring to FIG. 9, the display panel 110 may include first to $z^{th}$ groups GP1 to GPz.

How many rows each of the first to $z^{th}$ groups GP1 to GPz includes of pixels PXL may be determined by considering a cycle in which unintended bright spots are viewed in a sensing period SP of the pixels PXL. The row groups may include a first row group and a second row group. Each of the row groups may include two or more rows among the plurality of rows. This will be described in detail later with reference to FIG. 11.

Each of the first to $z^{th}$ groups GP1 to GPz may include pixels PXL of two or more rows. A case where each group includes pixels PXL of two rows is exemplarily illustrated.

In various embodiments, the first group GP1 may include pixels PXL of first and second rows. The pixels PXL of the first and second rows may be connected to the first scan line SL1 and the second scan line SL2, and be connected to the first sensing control line SSL1 and the second sensing control line SSL2.

In various embodiments, the second group GP2 may include pixels PXL of third and fourth rows. The pixels PXL of the third and fourth rows may be connected to the third scan line SL3 and the fourth scan line SL4, and be connected to a third sensing control line SSL3 and a fourth sensing line SSL4.

In various embodiments, the $z^{th}$ group GPz may include pixels PXL of (p−1)th and $p^{th}$ rows. The pixels PXL of the (p−1)th and $p^{th}$ rows may be connected to the (p−1)th scan line SL(p−1) and the $p^{th}$ scan line SLp, and be connected to a (p−1)th sensing control line SSL(p−1) and a $p^{th}$ sensing control line SSLp.

Figure 10:
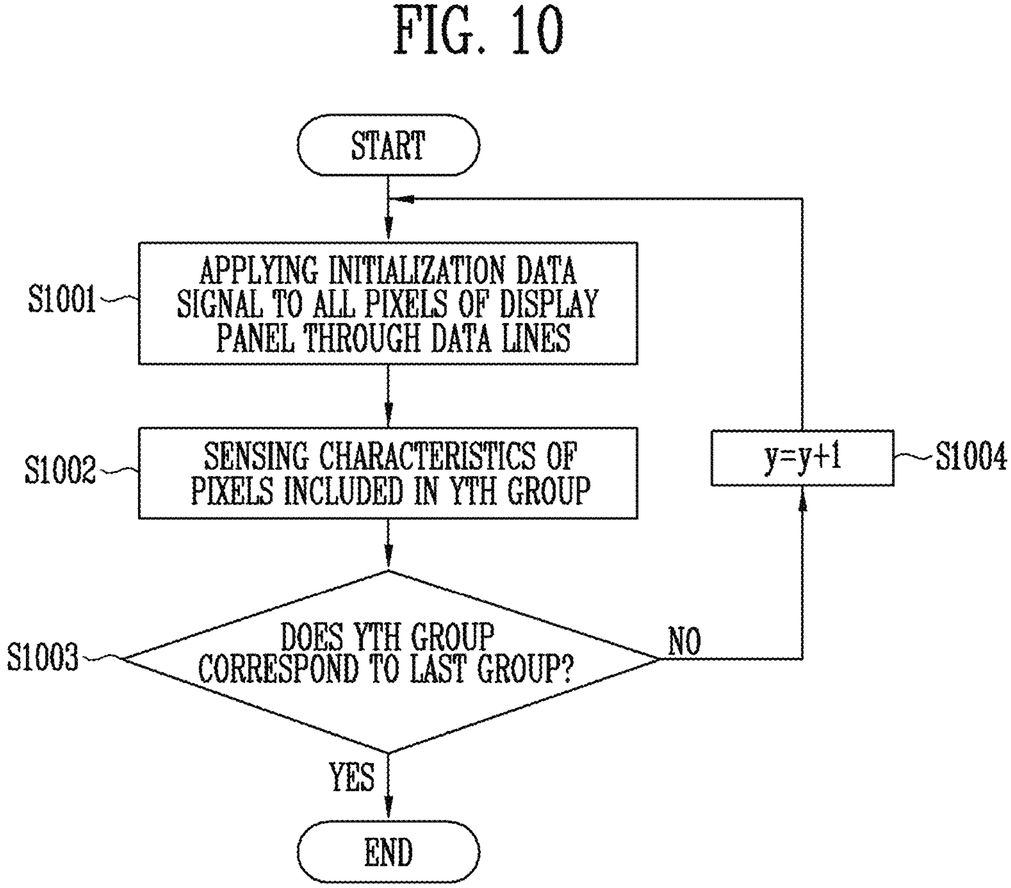
FIG. 10 is a flowchart illustrating another embodiment of the method of sensing the electrical characteristics of the pixels.

FIG. 10 is a flowchart illustrating another embodiment of the method of sensing the electrical characteristics of the pixels.

Referring to FIGS. 1, 2, 9, and 10, in S1001, an initialization data signal may be applied to first nodes N1 of the pixels PXL connected to the first to $p^{th}$ scan lines, and an initialization voltage may be supplied to second nodes N2 of the pixels PXL connected to the first to $p^{th}$ scan lines.

In S1002, characteristics of pixels PXL of a $y^{th}$ group GPy may be sensed (y is an integer of 1 or more and z or less). Each of rows corresponding to the $y^{th}$ group GPy may be selected, and characteristics of pixels PXL of the selected row may be sensed. Electrical characteristics of pixels PXL of each row may be sensed as described in S502 shown in FIG. 5.

In S1003, it may be determined whether the $y^{th}$ group GPy corresponds to a last group. When the $y^{th}$ group GPy corresponds to the last group, a sensing operation may be ended.

When the $y^{th}$ group GPy does not correspond to the last group, in S1004, a (y+1)th group GP(y+1) as a next group may be selected as the $y^{th}$ group GPy. Subsequently, S1001 to S1003 may be re-performed.

Figure 11:
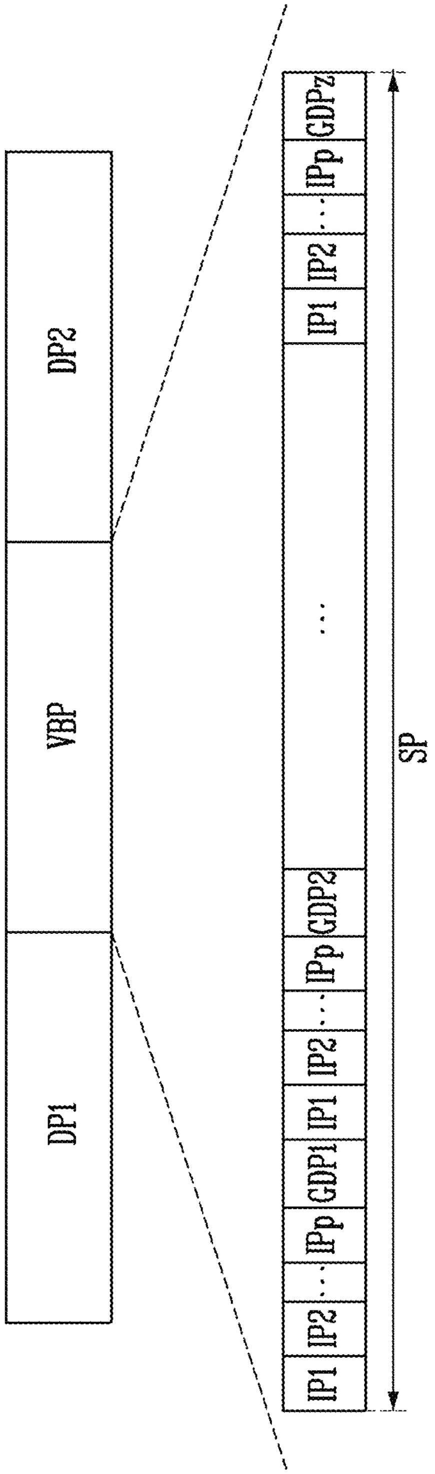
FIG. 11 is a timing diagram illustrating an embodiment of the method of sensing the electrical characteristics of the pixels, which is shown in FIG. 10.

FIG. 11 is a timing diagram illustrating an embodiment of the method of sensing the electrical characteristics of the pixels, which is shown in FIG. 10.

As described with reference to FIG. 4, a vertical blank period VBP may be disposed between adjacent display periods. For example, as shown in FIG. 11, a vertical blank period VBP may be provided between a first display period DP1 and a second display period DP2. The data signals may be provided to the plurality of pixels during a display period. The timing controller 121 may boost the second power source VSS during the blank period, where the blank period different from the display period.

Referring to FIGS. 1, 2, 9, and 11, the vertical blank period VBP may include a sensing period SP for sensing a characteristic of at least one pixel PXL.

The sensing period SP may include first to $p^{th}$ initialization periods IP1 to IPp for initializing pixels PXL connected to first to $p^{th}$ scan lines SL1 to SLp and first to $z^{th}$ group sensing data acquisition periods GDP1 to GDPz for sensing characteristics of the pixels PXL included in the first to $z^{th}$ groups GP1 to GPz.

First, the first to $p^{th}$ initialization periods IP1 to IPp may be provided. Hereinafter, descriptions of portions overlapping with those shown in FIG. 6 will be omitted. In addition, the first to $z^{th}$ group sensing data acquisition periods GDP1 to GDPz will be described below with reference to FIGS. 9 and 11.

When the first to $p^{th}$ initialization periods IP1 to IPp are ended, the first group sensing data acquisition period GDP1 for the pixels PXL included in the first group GP1 is started.

Each of rows corresponding to the first group GP1 may be selected, and characteristics of pixels PXL of the selected row may be sensed in the same manner as, for example, the $n^{th}$ sensing data acquisition period DAPn shown in FIG. 6. As such, a sensing operation on each of a plurality of pixel rows may be performed after the first to $p^{th}$ initialization period IP1 to IPp.

In this manner, the first to $p^{th}$ initialization periods IP1 to IPp and one group sensing data acquisition period may be performed. For example, the first to $p^{th}$ initialization periods IP1 to IPp may be performed before the second group sensing data acquisition period GDP2, and the first to $p^{th}$ initialization periods IP1 to IPp may be performed before the $z^{th}$ group sensing data acquisition period GDPz. As such, in accordance with an embodiment of the present disclosure, the first to $p^{th}$ initialization periods IP1 to IPp may be performed before a $y^{th}$ group sensing data acquisition period GDPy.

As described with reference to FIG. 6, when the first to $p^{th}$ initialization periods IP1 to IPp (see FIG. 6) are performed before each of the first to $p^{th}$ sensing data acquisition periods DAP1 to DAPp (see FIG. 6) is performed, the first to $p^{th}$ sensing data acquisition periods DAP1 to DAPp (see FIG. 6) may be performed p times.

As the performance number of the first to $p^{th}$ initialization periods IP1 to IPp (see FIG. 6) increases, the sensing period SP may increase.

On the other hand, in accordance with the embodiment of the present disclosure, which is described with reference to FIG. 11, the first to $p^{th}$ initialization periods IP1 to IPp are performed, and a sensing operation on each of a plurality of pixel rows is performed, so that the performance number of the first to $p^{th}$ initialization periods IP1 to IPp can decrease. Accordingly, the increase in the sensing period SP can be minimized.

When one group sensing data acquisition time is performed, how many rows a sensing operation is performed on of may be determined by considering a cycle in which unintended bright spots are viewed in a sensing period SP of pixels PXL. For example, when a sensing operation on two pixel rows is performed for each group sensing data acquisition period, the unintended bright spots of the pixels PXL are not viewed. However, when a sensing operation on three pixel rows is performed for each group sensing data acquisition period, the unintended bright spots of the pixels PXL may be viewed. When one group sensing data acquisition period is performed, a sensing operation on two pixel rows may be performed, and the first to $p^{th}$ initialization period IP1 to IPp may be performed.

Figure 12:
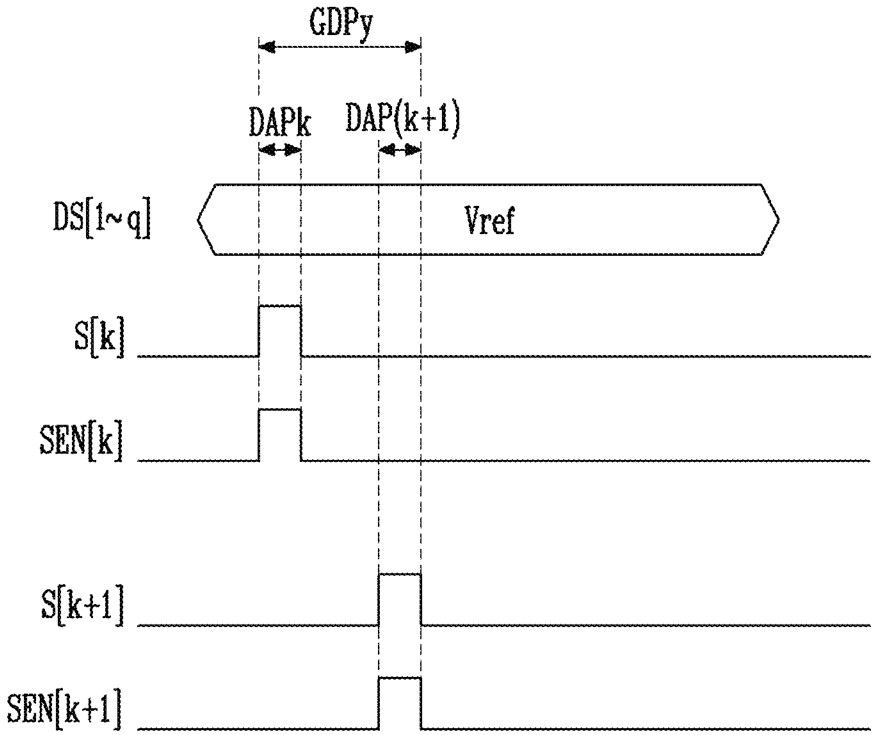
FIG. 12 is a timing diagram illustrating an embodiment of a $y^{th}$ group sensing data acquisition period shown in FIG. 11.

FIG. 12 is a timing diagram illustrating an embodiment of the $y^{th}$ group sensing data acquisition period shown in FIG. 11.

Referring to FIGS. 1, 11, and 12, the $y^{th}$ group sensing data acquisition period GDPy for the pixels PXL included in the $y^{th}$ group GPy is started.

The data driver 122 may apply a reference voltage Vref to the data lines DL1 to DLq. The reference voltage Vref may be a voltage having a magnitude to a degree to which light emitting elements LD are not turned on.

The $y^{th}$ group GPy may include a kth and (k+1)th pixel rows.

First, a sensing operation on the kth pixel row may be performed in a kth sensing data acquisition period DAPk. The scan driver 123 may apply a scan signal S[k] to a kth scan line SLk. Also, the scan driver 123 may apply a sensing control signal SEN[k] to a kth sensing control line SSLk. Accordingly, pixels PXL of a kth row may be selected, and electrical characteristics of the selected pixels PXL may be sensed.

Subsequently, a sensing operation on the (k+1)th pixel row may be performed in a (k+1)th sensing data acquisition period DAP(k+1). The scan driver 123 may apply a scan signal S[k+1] to a (k+1)th scan line SL(k+1), and apply a sensing control signal SEN[k+1] to a (k+1)th sensing control line SSL(k+1). Accordingly, pixels PXL of a (k+1)th row may be selected, and electrical characteristics of the selected pixels PXL may be sensed.

In accordance with the present disclosure, there can be provided a bonding device capable of applying pressure to a bonding target with improved reliability, and its operating method.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a display panel including a plurality of pixels arranged along a plurality of rows, wherein the plurality of pixels are connected to data lines and sensing lines; and a display driver configured to receive input image data, and display an image by providing image data signals to the plurality of pixels through the data lines, based on the received input image data, wherein the plurality of rows are divided into row groups, and each of the row groups includes at least two rows among the plurality of rows, and wherein the display driver is configured to:

while selecting each of the plurality of rows, acquire sensing data associated with pixels of the selected row through the sensing lines; and apply an initialization data signal to the plurality of pixels of each row group through the data lines before selection of any row of the respective row group is selected.

2. The display device of claim 1, wherein the row groups include a first row group and a second row group, wherein the first row group includes at least two first rows among the plurality of rows, and the second row group includes at least two second rows among the plurality of rows, and wherein the display driver is configured to apply the initialization data signal to the plurality of pixels of each of the first and second row groups through the data lines before any row of the respective row group is selected.

3. The display device of claim 2, wherein the display driver is configured to apply the initialization data signal to the plurality of of the second row group through the data lines before any row of the second row group is selected.

4. The display device of claim 1, wherein the initialization data signal is a black data voltage corresponding to a black grayscale.

5. The display device of claim 1, wherein the display driver includes a timing controller, a data driver, and a scan driver, wherein each of the plurality of pixels includes:

a pixel circuit connected to one of the data lines and one of the sensing lines; and a light emitting element connected between a first power source and a second power source, the light emitting element being connected to the first power source through the pixel circuit, and wherein the pixel circuit includes a first transistor connected between the first power source and the light emitting element, a second transistor connected between one of the data lines and the first transistor, a first internal node connected between the first transistor and the second transistor, and a second internal node connected between the first transistor and the light emitting element.

6. The display device of claim 5, wherein, the image data signals are provided to the plurality of pixels during a display period, and the timing controller boosts the second power source during a blank period different from the display period.

7. The display device of claim 5, wherein the second transistor of each of the plurality pixels is turned on, wherein the initialization data signal is applied to the first internal node.

8. The display device of claim 7, wherein, when the initialization data signal is applied to the first internal node, an initialization voltage is applied to the second internal node.

9. The display device of claim 8, wherein a voltage of the initialization data signal is equal to or lower than the initialization voltage.

10. A method of operating a display device including a plurality of pixels arranged along a plurality of rows, the method comprising:

dividing the plurality of rows into row groups, wherein each of the row groups includes at least two rows among the plurality of rows;

acquiring sensing data associated with pixels of a selected row among the rows through sensing lines in a blank period different from a display period, while selecting each of the plurality of pixels; and applying an initialization data signal to the plurality of pixels of each row group through data lines before any row of the respective row group is selected.

11. The method of claim 10, wherein the row groups include a first row group and a second row group, wherein the first row group includes at least two first rows among the plurality of rows, and the second row group includes at least two second rows among the plurality of rows, and wherein the applying of the initialization data signal to the plurality of pixels includes applying the initialization data signal to the plurality of pixels of the plurality of rows of the first row group through the data lines before before any row of the first row group is selected.

12. The method of claim 11, wherein the applying of the initialization data signal to the plurality of pixels includes applying the initialization data signal to the plurality of second row group through the data lines before any row of the second row group is selected.

13. The method of claim 10, wherein the initialization data signal is a black data voltage corresponding to a black grayscale.

14. The method of claim 10, wherein each of the plurality of pixels includes:

a pixel circuit connected to one of the data lines and one of the sensing lines; and a light emitting element connected between a first power source and a second power source, the light emitting element being connected to the first power source through the pixel circuit, and wherein the pixel circuit includes a first transistor connected between the first power source and the light emitting element, a second transistor connected between one of the data lines and the first transistor, a first internal node connected between the first transistor and the second transistor, and a second internal node connected between the first transistor and the light emitting element.

15. The method of claim 14, further comprising boosting the second power source in the blank period.

16. The method of claim 14, wherein the second transistor of each of the plurality pixels is turned on, wherein the initialization data signal is applied to the first internal node.

17. A method of operating a display device including a plurality of pixels arranged along a plurality of rows, the method comprising:

dividing the plurality of rows into row groups, wherein each of the row groups includes at least two rows among the plurality of rows;

acquiring sensing data associated with pixels of a selected row among the rows through sensing lines in a blank period different from a display period, while selecting each of the plurality of pixels; and applying an initialization data signal to a first internal node and applying an initialization voltage to a second internal node of the pixels of each row group through the data lines and the sensing lines, respectively, before any row of the respective row group is selected.

18. The method of claim 17, wherein a sensing control signal applies the initialization voltage to the pixels.

* * * * *